(12) United States Patent
Lomax (10) Patent No.: US 12,151,160 B1
(45) Date of Patent: Nov. 26, 2024

(54) VIDEO GAMING HEALTH ENHANCER

(71) Applicant: Zamar Lomax, Victorville, CA (US)

(72) Inventor: Zamar Lomax, Victorville, CA (US)

(73) Assignee: Zamar Lomax, Victorville, CA (US)

( * ) Notice: Subject to any disclaimer, the term of this patent is extended or adjusted under 35 U.S.C. 154(b) by 0 days.

(21) Appl. No.: 18/396,654

(22) Filed: Dec. 26, 2023

(51) Int. Cl.
*A63F 13/40* (2014.01)
*A63F 13/212* (2014.01)

(52) U.S. Cl.
CPC ............ *A63F 13/40* (2014.09); *A63F 13/212* (2014.09)

(58) Field of Classification Search
CPC ................................ A63F 13/40; A63F 13/212
See application file for complete search history.

(56) References Cited

U.S. PATENT DOCUMENTS

| | | | |
|---|---|---|---|
| 8,308,562 B2 | 11/2012 | Patton | |
| 9,511,289 B2 * | 12/2016 | Bond | A63F 13/212 |
| 11,130,064 B2 | 9/2021 | Kahn, II et al. | |
| 11,707,680 B2 | 7/2023 | Bartolome et al. | |
| 11,772,000 B2 | 10/2023 | Barcias | |
| 2014/0121017 A1 | 5/2014 | Mandryk et al. | |
| 2023/0381662 A1 | 11/2023 | Dorn et al. | |

FOREIGN PATENT DOCUMENTS

| | | |
|---|---|---|
| CN | 113764095 | 12/2021 |
| GB | 2554417 | 11/2016 |

OTHER PUBLICATIONS

"Tetris 64," TetrisWiki (website).
Alexis Santos, "Researchers create video game that monitors heart rate to keep children's anger in check," Engadget (website) Blog, Oct. 26, 2012, Engadget.
Eli Hodapp, "Upcoming 'Skip a Beat!' Uses Your Actual Heart Rate For Score Multipliers" TouchArcade (website) Oct. 6, 2014.
Christina Couch, "Keep Calm and Play On: Video Games That Track Your Heart Rate" MIT Technology Review (website) Sep. 21, 2015.

* cited by examiner

*Primary Examiner* — Thomas H Henry (57) ABSTRACT

Systems and methods for a computer-based gaming system and/or its associated components to receive and analyze a user's vital sign(s) information and in response to a detected unhealthy condition, alter functionalities to a computer-based gaming system and its associated components in a manner to improve the unhealthy condition.

15 Claims, 9 Drawing Sheets

VIDEO GAMING HEALTH ENHANCER

BACKGROUND

Technical Field

This disclosure relates to video games and computer-based gaming systems, and, more particularly, to video gaming safety.

Description of Related Art

Video and other types of computer-based gaming systems have been around for years. With the ongoing development of making video games more amusing and addictive, may bring problems. Video games may impose harmful stresses on players that can lead to deterioration in health.

Parental controls may be used to limit the amount of time a user is playing a video game; however, the results may not always be effective. Statistics reveal that a substantial 70% of gamers globally are aged 18 and older. This predominance of adult gamers raises a issue: traditional parental controls, predominantly designed for and implemented by parents for their children, may not be effective for this majority demographic.

In some cases, video games may issue warnings for their video games such as: health and safety warnings, age ratings and content warnings, stress and difficulty level warnings, online interaction warnings, motion sickness warnings, and extended play warnings. These warnings may not be effective because, due to the psychological effects an addictive and amusing video game may impose on a player, a player may simply ignore these warnings and proceed with their gaming sessions.

In some cases, health professionals may prescribe medications to players to help treat stress, anxiety and depression that may be brought upon by gaming sessions. However, this treatment may not always be safe and effective. These medications may not be effective on every player experiencing these symptoms. These medications may also bring on side effects to the player such as negatively impacting their cognitive and motor skills which may be crucial for a player to properly play and enjoy the video game which may cause more stress, depression, and anxiety on the player. There may be many more side effects of medications that negatively influence a player's health such as: weight gain, sleep disturbances, sexual dysfunction, mood swings, and increased anxiety or depression to name a few. Many players may not even seek or use such medications.

In some cases, a player may engage in non-pharmacological approaches to treat their condition(s) such as attending counseling or therapy sessions. However, this method may not always be effective. One issue may be financial and accessibility issues. Regular therapy sessions may be expensive and may not be covered by insurance. Additionally, access to qualified therapists, especially those specializing in gaming-related issues, may be limited in some areas. Another issue may be individual engagement and motivation. The effectiveness of therapy may largely depend on the individual's level of engagement and motivation. If a person is not fully committed to the process or is attending sessions due to external pressure (like family insistence), they may not benefit as much.

SUMMARY

A non-transitory computer-readable storage media may contain a program of instructions that may be run in conjunction with a computer-based gaming system that may generate digital media that a user of the gaming system may interact with in one or more ways. The computer-based gaming system may receive information indicative of at least one vital sign of the user. The computer-based gaming system may determine whether the received information is indicative of an unhealthy condition in the user that may be caused by one or more of the ways in which the user interacts with the digital media. In response to a determination that the received information is indicative of such an unhealthy condition in the user, the computer-based gaming system may alter one or more of the ways in which the user may interact with the digital media that is or are likely to be contributing to the unhealthy condition in the user in a manner that may improve the unhealthy condition. The computer-based gaming system may also or instead alter the environment surrounding the user to help relieve this unhealthy condition.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
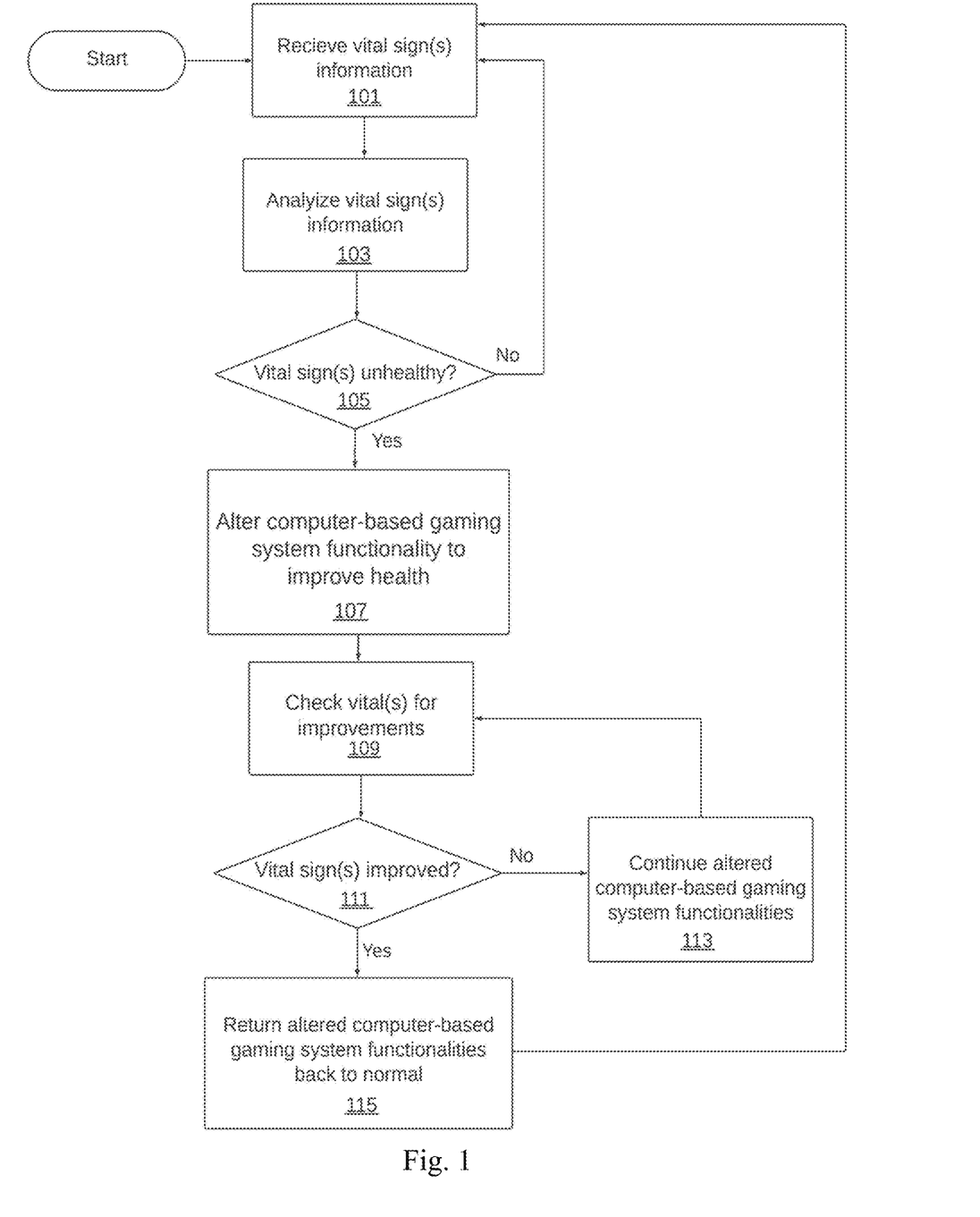
FIG. 1 is a flowchart of an example of a process of a computer-based gaming system.

FIG. 1 illustrates a process for enhancing user health during computer-based gaming system interaction. At step 101, the computer-based gaming system may receive vital sign(s) information. This information may be fundamental health metrics for assessing and monitoring a user's physiological, psychological, behavioral, and biometric status, essential for detecting potential unhealthy conditions.

At step 103, one or more vital sign detectors, integrated and/or attached and/or coupled with various devices and/or peripherals, may detect and/or analyze the vital signs. These devices may include, but are not limited to, input peripherals, wearable devices, digital media display devices, and components that are commonly used in conjunction with a computer-based gaming system.

Following data collection, the computer-based gaming system may analyze the vital sign(s) information to determine if the vital sign(s) indicate an unhealthy and/or potentially unhealthy condition as per step 105. The term 'unhealthy' may mean conditions that are harmful and/or potentially harmful, the user. The analysis may involve comparing the current vital sign(s) against predetermined health benchmarks and/or the user's historical and/or real-time health metrics. If the vital signs(s) are healthy, the computer-based gaming system loops back to "receive vital sign(s) information 101.

If unhealthy vital sign(s) are detected, the process may proceed to step 107, where the functionalities of the computer-based gaming system may be altered in a manner to improve the user's health.

Next process may reevaluate the user's vital signs at step 109.

Based on the reevaluation at step 111, if the user's vital signs have improved, the computer-based gaming system may return the altered functionalities to their original state as per step 115. If no improvement is observed, the computer-based gaming system may continue the altered functionalities as indicated at step 113.

Altering and/or alter and/or alteration and/or altered may mean, stopping, restricting, adding, reducing, lowering, increasing, activating, deactivating, blocking, removing, terminating, controlling, executing, modifying, assisting, displaying, and processing, among others.

Figure 2:
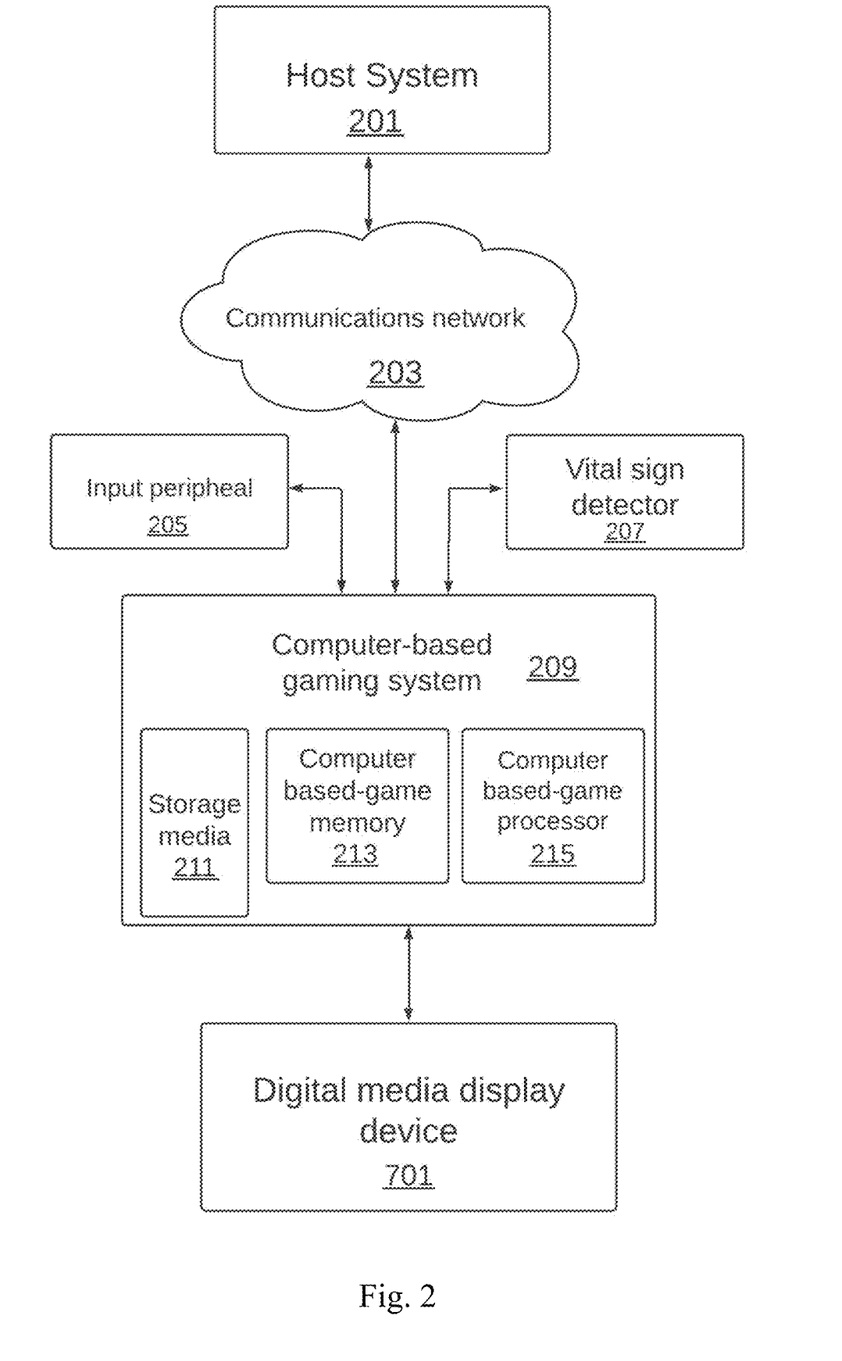
FIG. 2 is an example of a hardware topology diagram of a computer-based gaming system.

FIG. 2 illustrates a schematic detailing the architecture and interconnectivity inherent in a computer-based gaming system.

At the pinnacle of this architecture, the Host system 201 may function as the primary controller, facilitating communication and directing gaming operations. The Host system may take various forms, including but not limited to a server, a mainframe, a workstation, an embedded system, a gateway, cloud infrastructure, a virtual machine, a router, or an edge device. The processing and/or analysis and/or alteration of data may be conducted here.

The communications network 203 may function as a central hub for data exchange within the gaming system, leveraging a variety of networking technologies. These technologies may include, but are not limited to, Wi-Fi, Bluetooth, cellular networks, cloud services, fiber optic connections, Ethernet, and other wired or wireless communication methods. This communications network 203 may facilitate interactions between various system modules and provide access to a range of online services, including game hosting, media streaming, and other interactive user services. The communications network 203 may also be capable of processing, analyzing, and potentially altering data as part of its operational framework.

The Input peripheral 205 may capture user input through devices such as joysticks, gamepads, keyboards, and touch screens, among others. The processing and/or analysis and/or alteration of vital sign information may be conducted here.

The Vital sign detector 207, which may be integrated into and/or function alongside the computer-based gaming system 209, can be positioned on or near the user to monitor various physiological and/or psychological and/or biometric and/or behavioral health metrics. This vital sign detector 207 may be equipped with an array of sensors, each designed to capture data related to vital signs. These sensors may be capable of monitoring weight, and/or vocal functions, and/or ocular health, and/or auditory functions, and/or cardiac activity, and/or respiratory rate, and/or blood pressure, and/or thermoregulation, and/or expressive behaviors, and/or neurological functions. The collected data from these sensors may undergo processing and/or analysis, which could lead to alterations in various components of the gaming system.

Additionally, a camera and/or camcorder, and/or webcam may aid in determining unhealthy conditions through the analysis of facial expressions and/or body language. These imaging devices are capable of capturing visual cues that can be indicative of health issues, such as changes in facial expression, posture, and other physical behaviors.

Additionally, one or more vital sign detectors 207, integrated and/or attached and/or coupled with various devices and/or peripherals, may detect and/or analyze the vital signs. These devices may include, but are not limited to, input peripherals, wearable devices, display devices, and components used in conjunction with a computer-based gaming system. Techniques employed by these detectors may involve optical sensing, electrical bio-impedance, ultrasonography, acoustic sensing, temperature sensing, electroencephalography readings (EEG readings), facial detection, and/or electrical neural monitoring, for capturing a broad spectrum of a user's health metrics.

Additionally, computer-based gaming system may work in conjunction with a microphone and/or headset that listens to the user's words and/or tone. This auditory input may allow for the assessment of potentially unhealthy and/or unhealthy conditions by analyzing vocal characteristics.

These sensors may be capable of monitoring various vital signs, utilizing established medical and health monitoring technologies and/or techniques appropriate for each vital sign.

The computer-based gaming system 209 may serve as the execution platform for games and may include components such as a motherboard, storage devices, memory, processors, input peripherals, and output devices. It may include functionalities such as web browsing, media playback, messaging, photo and video capture, sound recording and editing, payment processing, pedometer tracking, cellular communications, time display, and Global Positioning System (GPS) services and/or others. The computer-based gaming system 209 may also support multiplayer environments for both online and local play. The processing and/or analysis and/or alteration of data may be conducted here.

The computer-based game processor 215, typically known as the CPU, may manage the computational demands of gameplay, graphics rendering, and game mechanics. The processing and/or analysis and/or alteration of data may be conducted here.

Storage media 211 may store game files, user profiles, downloadable content, updates, and other personalizing data. It may also contain programs responsible for altering the gaming system's functionality. The processing and/or analysis and/or alteration of data may be conducted here.

Finally, the Digital media display device 701 may render gaming content to the user, potentially employing various display technologies and connecting to the gaming system via multiple interfacing options. The processing and/or analysis and/or alteration of data may be conducted here.

The computer-based gaming system 209 may be equipped with functionalities to support online multiplayer gaming. This includes the necessary hardware and software components to enable networked play, allowing users to connect and/or interact with other players across various digital platforms. The computer-based gaming system 209 architecture may incorporate servers, networking hardware, and/or optimized software protocols designed to facilitate online play.

In the schematic architecture of the computer-based gaming system, 209 communications network 203 and/or vital sign detection capabilities may be integrated to support online gameplay involving health monitoring. This may enable the computer-based gaming system 209 to connect with other players over a network, allowing for the real-time exchange and/or analysis of vital sign data during multiplayer sessions.

The communications network 203 may be configured to manage high-bandwidth data transfer, ensuring accurate and prompt communication of vital sign information from each player. The computer-based gaming system 209 may also include algorithms and/or processing units capable of analyzing these health metrics, contributing to a responsive and health-conscious multiplayer gaming experience.

The computer-based gaming system 209, encompassing its integrated and/or connected hardware, and/or firmware, and/or software components-which may include input peripheral 205 and/or a host system, 201 and/or a vital sign detector, 207 and/or a communications network 203—may employ a range of established health metric analysis methods and/or industry-standard software tools, to process and/or interpret data across various vital signs. In addition to monitoring a user's vital signs, the computer-based gaming system 209 may also be equipped to measure muscle activity in the user's wrist or hand, which may be used for detecting and managing conditions like arthritis. These tools and methods may be specifically tailored to effectively analyze and manage data related to various health metrics.

The processes and functionalities depicted in the flow chart of FIG. 1 may be executed in conjunction with any of the components illustrated in FIG. 2.

Figure 3:
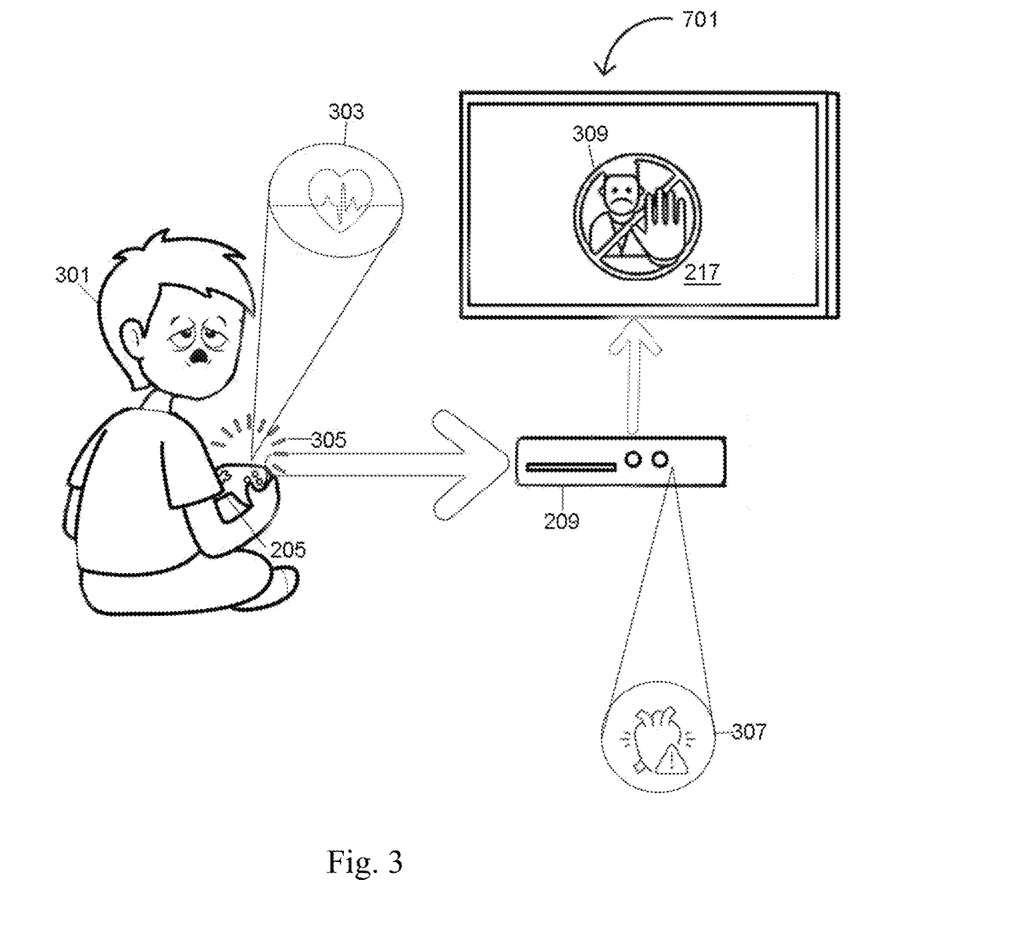
FIG. 3 is an example of a computer based-gaming system altering functionalities in the digital media response to a user's unhealthy condition.

FIG. 3 illustrates the response of a computer-based gaming system 209 when it detects an unhealthy condition 307 in a user 301. The user 301 is shown utilizing an input peripheral 205, which is capable of not only registering user inputs but also collecting vital sign information 305, such as heartbeat.

The input peripheral 205 is equipped with sensors that detect and transmit vital sign information 305 to the computer-based gaming system 209 for further analysis.

Upon determining indicators of an unhealthy condition 307 from the analysis, the computer-based gaming system 209 may activate an alert. This alert could be conveyed to the user 301 through visual, auditory, and/or haptic feedback via the digital media display device 701.

In response to identifying a potentially unhealthy and/or unhealthy condition 307, the computer-based gaming system 209 may alter 309 the interaction of the user 301 with the digital media 217, in a manner to improve the unhealthy condition. 307

Figure 4:
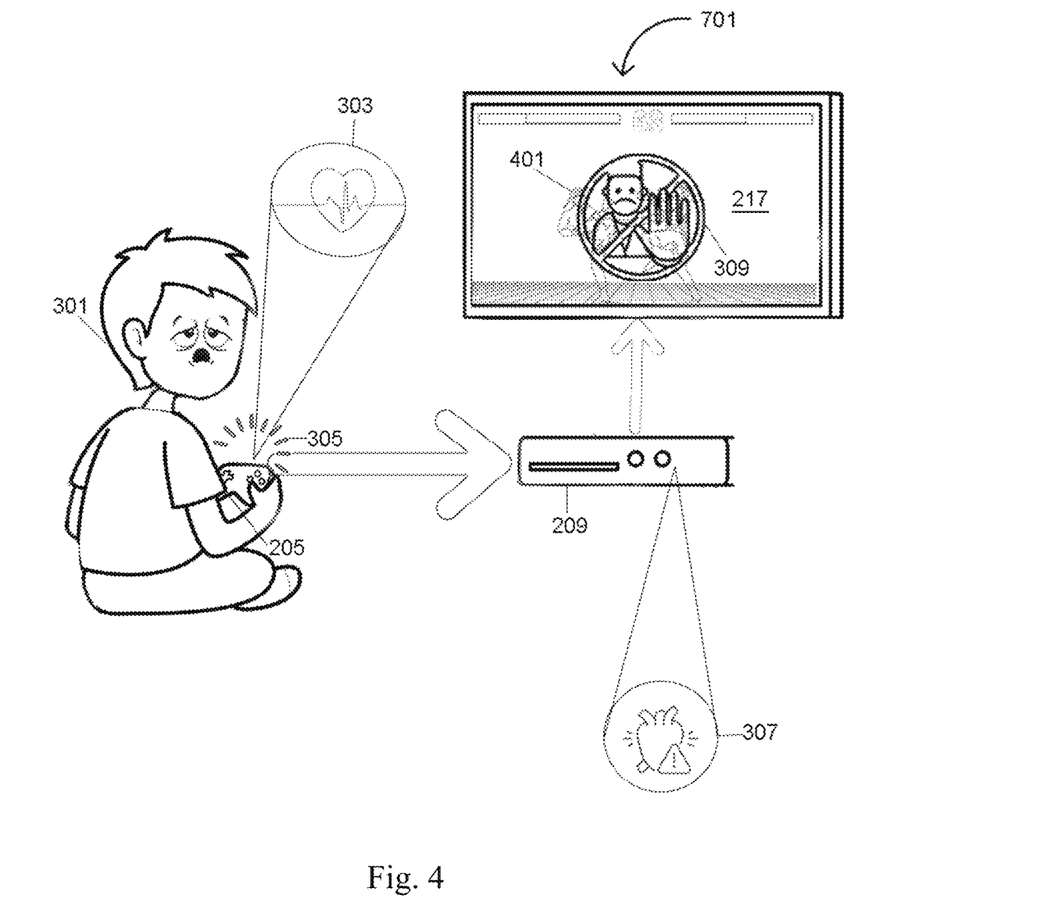
FIG. 4 is an example of a computer based-gaming system altering functionalities to a virtual character in response to a user's unhealthy condition.

FIG. 4 illustrates the response of a computer-based gaming system 209 when it detects an unhealthy condition 307 in a user 301. The user 301 is shown utilizing an input peripheral 205, which is capable of not only registering user inputs but also collecting vital sign information 305, such as heartbeat.

The input peripheral 205 is equipped with sensors that detect and transmit vital sign information 305 to the computer-based gaming system 209 for further analysis.

Upon determining indicators of an unhealthy condition 307 from the analysis, the computer-based gaming system 209 may activate an alert. This alert could be conveyed to the user 301 through visual, auditory, and/or haptic feedback via the digital media display device 701.

In response to identifying a potentially unhealthy and/or unhealthy condition 307, the computer-based gaming system 209 may alter 309 the interaction of the user 301 with the digital media 217, specifically altering 309 the virtual character 401 in a manner to improve the unhealthy condition. 307

Figure 5:
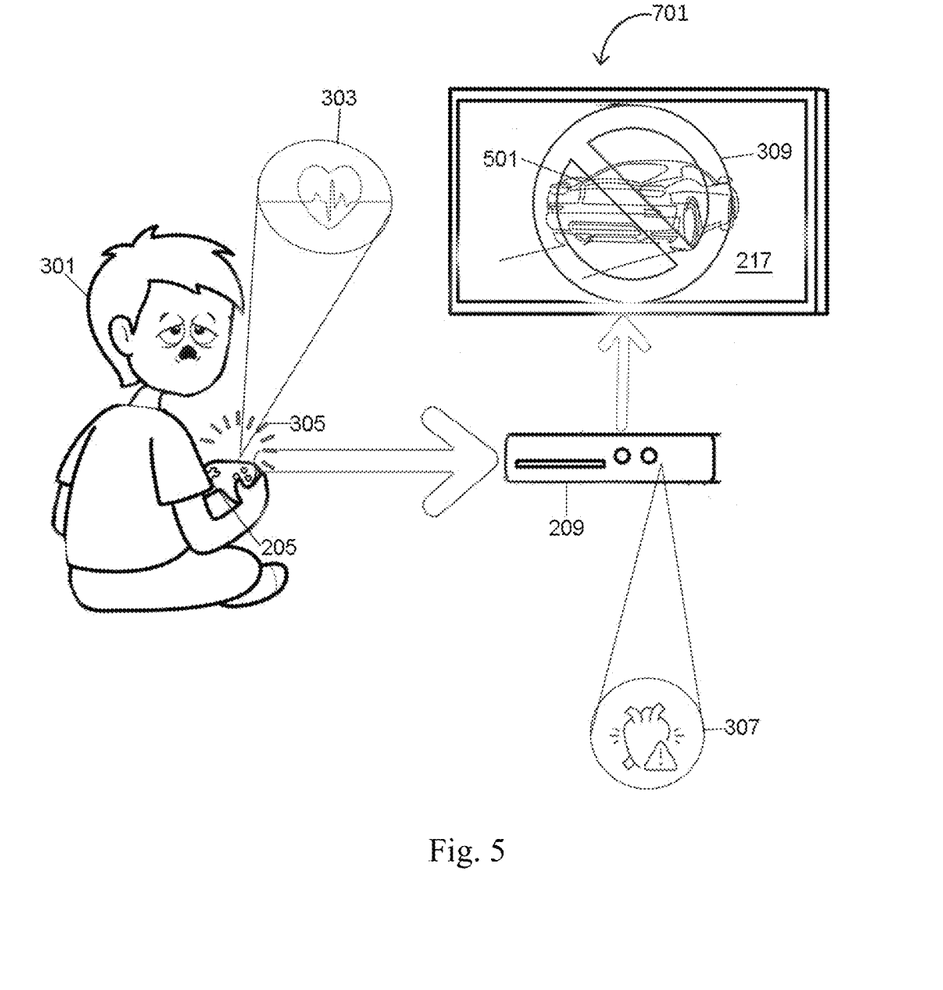
FIG. 5 is an example of a computer based-gaming system altering functionalities to a virtual vehicle in response to a user's unhealthy condition.

FIG. 5 illustrates the response of a computer-based gaming system 209 when it detects an unhealthy condition 307 in a user 301. The user 301 is shown utilizing an input peripheral 205, which is capable of not only registering user inputs but also collecting vital sign information 305, such as heartbeat.

The input peripheral 205 is equipped with sensors that detect and transmit vital sign information 305 to the computer-based gaming system 209 for further analysis.

Upon determining indicators of an unhealthy condition 307 from the analysis, the computer-based gaming system 209 may activate an alert. This alert could be conveyed to the user 301 through visual, auditory, and/or haptic feedback via the digital media display device 701.

In response to identifying a potentially unhealthy and/or unhealthy condition 307, the computer-based gaming system 209 may alter 309 the interaction of the user 301 with the digital media 217, specifically altering 309 the virtual vehicle 501 in a manner to improve the unhealthy condition. 307

Figure 6:
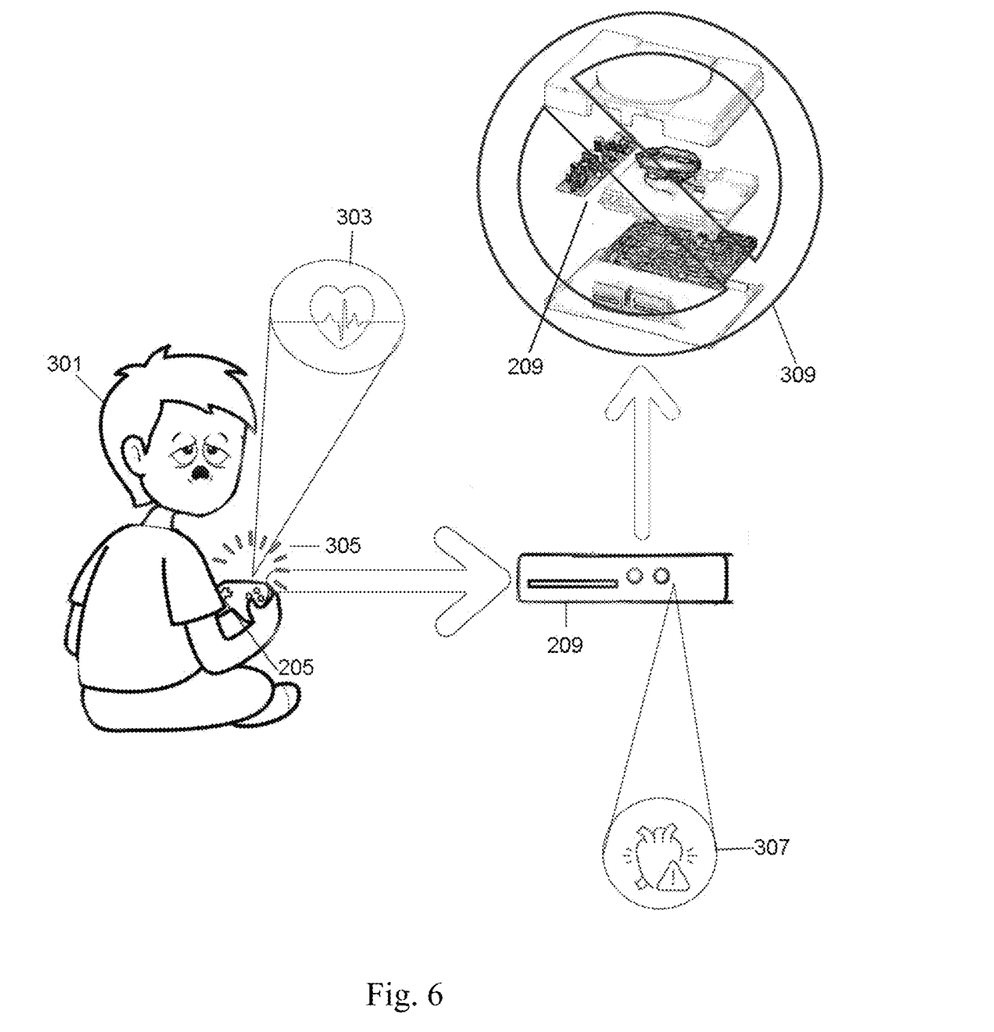
FIG. 6 is an example of a computer based-gaming system altering functionalities to components of a computer based-gaming system in response to a user's unhealthy condition.

FIG. 6 illustrates the response of a computer-based gaming system 209 when it detects an unhealthy condition 307 in a user 301. The user 301 is shown utilizing an input peripheral 205, which is capable of not only registering user inputs but also collecting vital sign information 305, such as heartbeat.

The input peripheral 205 is equipped with sensors that detect and transmit vital sign information 305 to the computer-based gaming system 209 for further analysis.

Upon determining indicators of an unhealthy condition 307 from the analysis, the computer-based gaming system 209 may activate an alert. This alert could be conveyed to the user 301 through visual, auditory, and/or haptic feedback via the digital media display device 701.

In response to identifying a potentially unhealthy and/or unhealthy condition 307, the computer-based gaming system 209 may alter 309 the interaction of the user 301 with the digital media 217, specifically altering 309 the computer-based gaming system 209 in a manner to improve the unhealthy condition 307.

Figure 7:
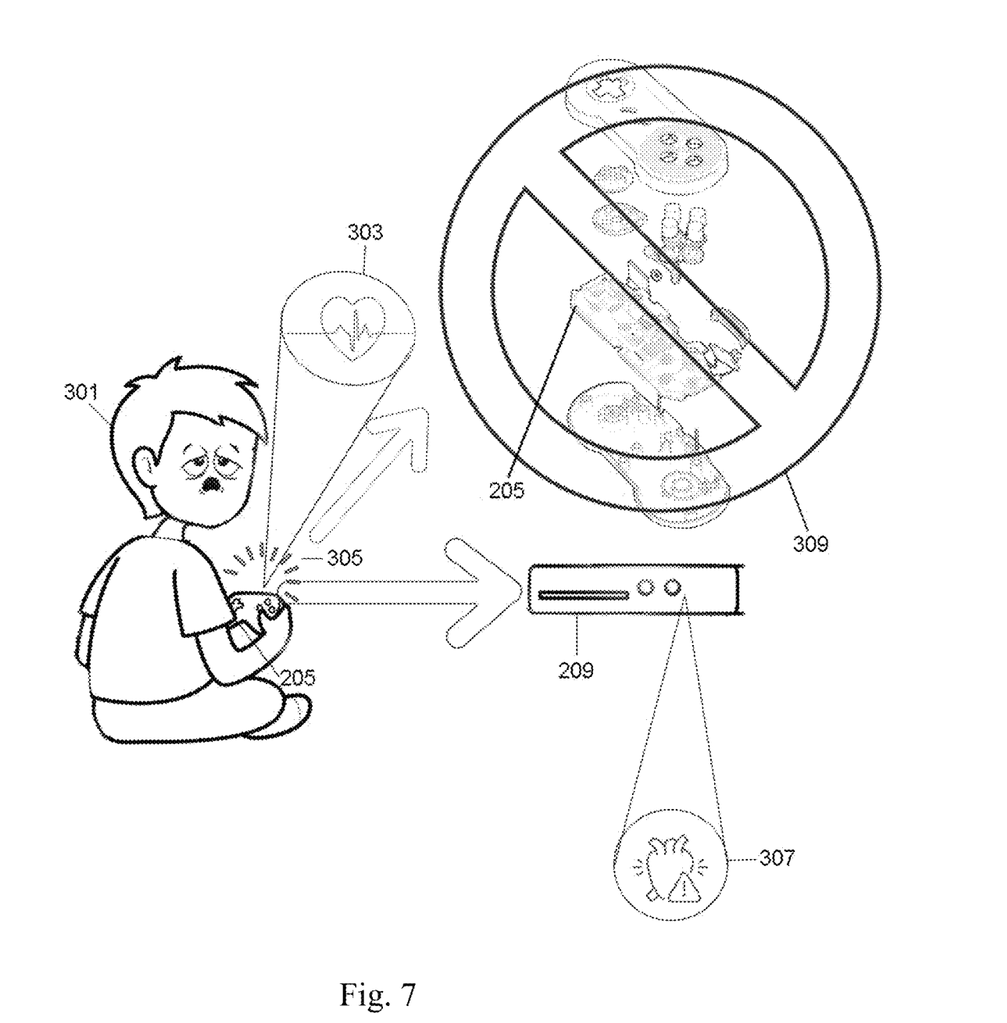
FIG. 7 is an example of a computer based-gaming system altering functionalities to an input peripheral in response to a user's unhealthy condition.

FIG. 7 illustrates the response of a computer-based gaming system 209 when it detects an unhealthy condition 307 in a user 301. The user 301 is shown utilizing an input peripheral 205, which is capable of not only registering user inputs but also collecting vital sign information 305, such as heartbeat.

The input peripheral 205 is equipped with sensors that detect and transmit vital sign information 305 to the computer-based gaming system 209 for further analysis.

Upon determining indicators of an unhealthy condition 307 from the analysis, the computer-based gaming system 209 may activate an alert. This alert could be conveyed to the user 301 through visual, auditory, and/or haptic feedback via the digital media display device 701.

In response to identifying a potentially unhealthy and/or unhealthy condition 307, the computer-based gaming system 209 may alter 309 the interaction of the user 301 with the digital media 217, specifically the input peripheral 205 in a manner to improve the unhealthy condition.

FIGS. 3-7 are meant to be illustrative to show how the computer-based gaming system 209 may alter 309 a user's 301 interaction with the digital media 217 in a manner to improve the unhealthy condition 307. Although only heartbeat was illustrated in FIGS. 3-7, as the detected unhealthy condition 307 alterations 309 may be caused by other unhealthy conditions 307 in a user such as respiratory rate, temperature, EEG readings, and blood pressure to name a few.

Figure 8:
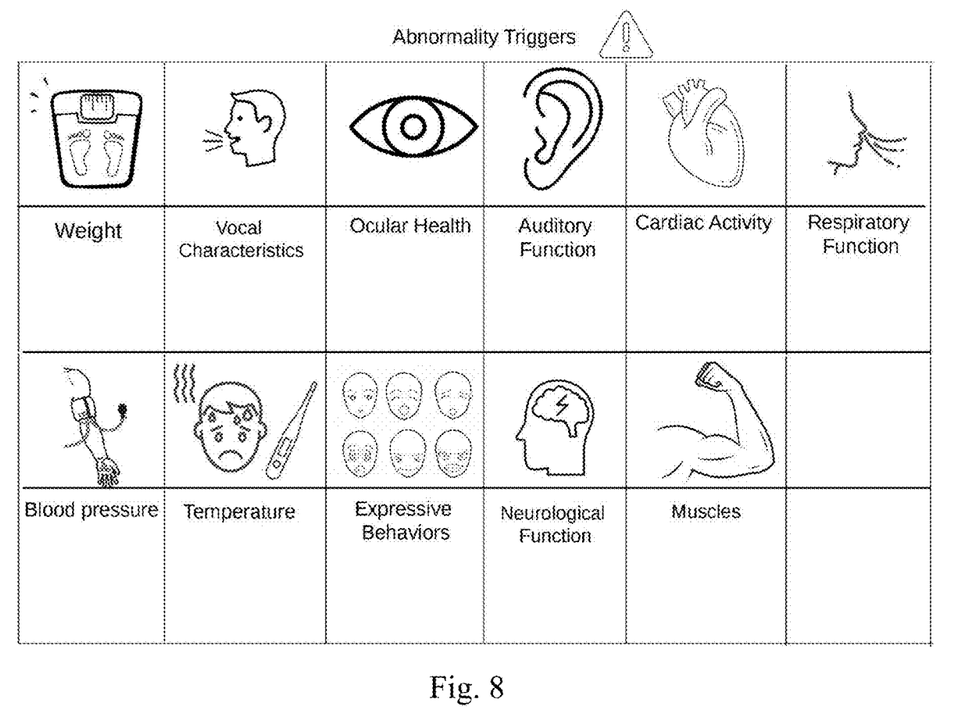
FIG. 8 is an example of a table of triggers that consist of unhealthy conditions that may cause a computer-based gaming system and its associated components to alter their functionalities.

FIG. 8 illustrates a variety of physiological, psychological, biometric and behavioral health metrics that the vital sign detector 207 may be designed to detect. These health metrics, if indicative of a potentially unhealthy and/or unhealthy condition 307, may trigger the computer-based gaming system 209 to alter 309 the user's 301 interaction with the digital media 217

An illustration representing 'Weight' may signify the computer-based gaming system's 209 capability to monitor for deviations from healthy weight ranges, which may include extreme weight loss or gain. The system may track such trends, offering early warnings and facilitating timely health interventions.

The 'Vocal Functions' visual may denote voice irregularities, including vocal cord conditions, speech quality issues, tone of voice, and certain words being spoken.

Ocular Health' may denote such as visual impairments or ocular diseases.

'Auditory Function' may denote ear and hearing health, including the identification of harmful sound exposure levels and the detection of conditions resulting from such exposure.

Cardiac Activity' may denote monitoring for a spectrum of heart-related health issues, ranging from rhythm irregularities and structural heart conditions to coronary and inflammatory heart diseases, potentially impacting cardiac function.

Respiratory Function' may denote a array of respiratory health issues, from oxygenation and ventilation problems to respiratory infections.

Blood Pressure' may denote hypertension and hypotension, as well as related cardiovascular health concerns that may affect the user's well-being.

Temperature' may denote issues related to the body's heat regulation, such as overheating (hyperthermia) or excessive cooling (hypothermia).

Expressive Behaviors' may denote signs of emotional, psychological, and/or physical distress through facial expressions and body language, potentially indicating stress, anxiety, depression, or other emotional disturbances.

Neurological Function' may denote neurological conditions that may manifest as cognitive impairments, motor function issues, or other neurological anomalies such as epilepsy.

The computer-based gaming system 209 may integrate data from multiple triggers to determine the presence of an unhealthy condition. 307

Figure 9:
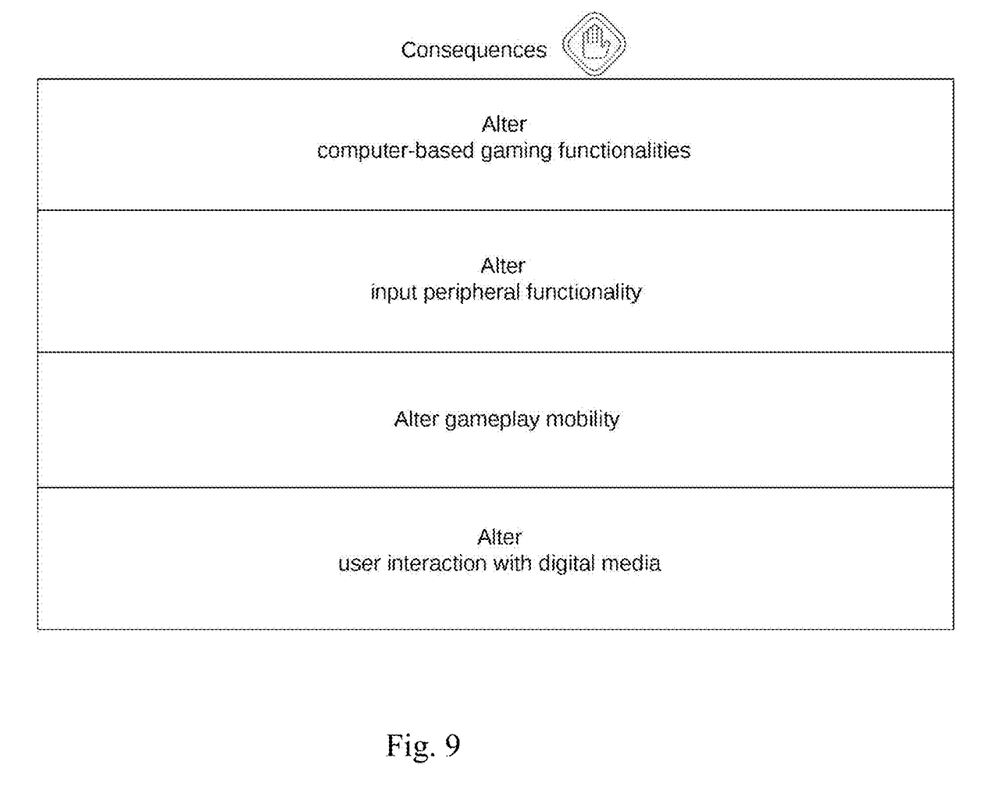
FIG. 9 is an example of a table of consequences that may occur in response to a computer based-gaming system detecting an unhealthy condition in a user.

FIG. 9 illustrates a table outlining potential consequences that may be enacted by the computer-based gaming system 209 upon detecting a potentially unhealthy and/or unhealthy condition 307 in a user 301, based on the analysis of physiological, and/or psychological, and/or behavioral and/or biometric health metrics. The table displays various consequences, including altering computer-based gaming functionalities, altering input peripheral functionality, altering gameplay mobility, and altering user interaction with digital media in a manner that is likely to improve the unhealthy condition 307. Methods and/or processes for implementing these alterations are described below.

The computer-based gaming system may include a feature to initiate emergency calls, such as 911, in scenarios where an unhealthy condition 307 is detected in the user. 301 This capability may allow the computer-based gaming system 209 to contact emergency services that may require immediate medical attention.

The computer-based gaming system, 209 may also utilize methods involving machine learning and/or artificial intelligence (AI), and/or pattern recognition, and/or algorithms to adapt the gaming experience. This adaptation may include the system's response to the user's 301 reactions to specific game elements or outcomes. The AI may alter 309 the gaming experience in real-time, potentially modifying game dynamics, content, or providing helpful suggestions. For example, the computer-based gaming system 209 may alter 309 the game in response to certain game content and/or elements and/or or due to repeated challenges. The AI's decision-making may be informed by an analysis of the user's historical interaction data and current gaming session, which may enable personalized game alterations 309 responsive to the user's 301 health.

As an example, if a user 301 is playing a video game and consistently exhibits increased and/or decreased vital signs, in response to an element like a spider on the screen, the computer-based gaming system 209 may suggest the possibility of a condition like Arachnophobia and offer real-life recommendations for addressing it. The computer-based gaming system 209 may also or instead propose in-game option(s) to alleviate the user's condition, such as removing certain elements (such as the spider) or allowing the user to skipping levels that contain elements that negatively influence the users 301 overall health.

Another aspect of AI utilization in the computer-based gaming system 209 may involve learning from the user's 301 behavioral patterns and/or physiological and/or psychological and/or biometric responses during gameplay. This may include the computer-based gaming system's 209 analysis of reactions to in-game events and/or game elements, whether specific or varied. Based on this data, the AI may adapt the gaming experience, potentially modifying game dynamics, and/or content, and/or providing strategic tips to the user 301. The AI's decision-making process may be informed by an analysis of the user's 301 historical interaction data and/or current gaming session, which may provide personalized game alterations 309.

For example, consider a scenario where the user is playing a computer-based gaming system 209 such as a slot machine. The computer-based system 209 may detect an increase in the user's heart rate and/or signs of frustration when the user sees and/or locks in one or two sevens in a row. In response, the AI may offer strategic tips and/or alter 309 the game. The computer-based gaming system 209 may also alter 309 the users 301 interaction with the digital media 217 in a way such as the odds of winning, to facilitate a more positive outcome. To ensure fairness and/or security measures, the computer-based gaming system 209 may include technologies like facial recognition and fingerprint identification, limiting this assistance to a predetermined number of times per user, with the possibility of utilizing a set cooldown period. This measure may be in place to prevent a user from abusing this assistance.

The computer-based gaming system 209 may also include a feature for providing in-game directions to the user. Utilizing AI, and/or machine learning, and/or pattern recognition technology, the computer-based gaming system 209 may analyze in-game events to determine the need for assistance. The computer-based system 209 may then offer directions or suggestions within the game, which may be tailored to the user's 301 current situation and gameplay progress.

For instance, in a scenario where a user is playing an adventure game and exhibits signs of frustration and/or confusion, the computer-based gaming system 209 may recognize that the user 301 is having trouble finding their way. In response, the AI may provide in-game hints and/or directional guidance to help the user navigate the game environment. This assistance may be based on an analysis of the user's current location in the game, and/or their gameplay history, and/or the in-game challenges they are facing.

The computer-based gaming system 209 may also include a feature that suggest actions to the user during gameplay. The computer-based gaming system 209 may guide the user on actions they should take, which may include pressing certain buttons whether in combination with one another or by themselves on the controller and/or performing specific movements with external motion-sensing devices. Depending on the context of the game and the user's 301 interaction with the game environment and/or input peripheral 205, the computer based-gaming system 209 may adapt its suggestions.

The computer-based gaming system 209 may also include features to alter 309 in-game resources and/or game mechanics. This may involve replenishing in-game resources such as items and/or health, and/or mana, and/or similar resources that enable the user to perform various actions within the game. The computer-based gaming system 209 may also or instead alter 309 game mechanics to assist the user. These alterations 309 may include, but are not limited to, enabling the user to jump higher, increasing the user's speed, enhancing aiming stability and accuracy, or increasing attack power to facilitate easier progression through the game.

Additionally, the computer-based gaming system 209 may alter certain game mechanics based on the user's 301 condition. For example, in a racing game, the computer-based gaming-system 209 may alter 309 the difficulty of executing maneuvers like drifting, making them easier to perform.

The computer-based gaming system 209 may also offer the user the option to skip a level and/or proceed directly to the next stage and/or cutscene of the game. This feature may allow the user to bypass challenging game segments.

The computer-based gaming system 209 may also include features that reduce(s) events of a game and/or the user's required effort for a game. These features may activate when the system detects an unhealthy and/or potentially unhealthy condition 307 in the user, 301.

Reducing the events of the game may involve decreasing the frequency and/or intensity of in-game challenges, and/or encounters, and/or tasks.

Similarly, the feature to reduce the user's required effort may alter the level of physical or mental engagement needed to progress in the game. This may include simplifying controls, and/or reducing the complexity of tasks, and/or providing additional in-game assistance.

The computer-based gaming system 209 may also integrate with massage technology embedded in gaming chairs and/or wearable devices such as neck braces, and/or wrist braces and/or hand braces. The computer-based gaming system 209 may trigger the massage functions in these devices that may help relieve stress and/or fatigue and/or pain and/or discomfort in a user 301 by providing physical comfort to the user 301 during gaming sessions.

The computer-based gaming system 209 may also be capable of altering 309 the environment around the user. 301 This may include changes in lighting, which could be altered 309 to create a more comfortable and less straining atmosphere for the user. 301 The computer-based gaming system 209 may also or instead modulate the intensity and/or color, and/or pattern of the lighting, Additionally, the computer-based gaming system 209 may also interface with climate control devices such as heaters, and/or fans, and/or air conditioning units, and/or heating units. The computer-based gaming system 209 may turn these devices on or off, and/or alter 309 their settings to higher or lower levels, and/or potentially even altering 309 the thermostat settings.

The computer-based gaming system 209 may also include a feature to slow down on-screen animations and/or movements, this slowing down of visual elements may involve reducing the speed of animations, transitions, or other dynamic aspects of the game. This may aid in lowering seizures and/or discomfort in users 301 who might be sensitive to rapid or flashing visuals.

The computer-based gaming system 209 may also include a feature to alter 309 the pixels being presented on the screen. The computer-based gaming system 209 may alter 309 the pixel presentation, which could involve changes in color balance, brightness, contrast, and/or the introduction of filters.

In addition to altering 309 visual elements, the computer-based gaming system 209 may alter 309 the pixels on the screen to display messages to the user. The computer-based gaming system 209 may display messages that inform the user of their current health status and/or provide suggestions for actions the user may take to possibly mitigate any identified unhealthy and/or potentially unhealthy conditions.

The computer-based gaming system 209 may also include input peripherals 205 integrated with heating and/or cooling functionalities, designed to warm or cool the user's hands. The heating and/or cooling functions in the input peripherals 205, such as game controllers, keyboards, and/or mice, can be activated to provide thermal comfort to the user. 301 The computer-based gaming system 209 may alter 309 the temperature of these input peripherals 205 based on real-time analysis of the user's physical state and/or environmental conditions. For example, during prolonged gaming sessions in cold conditions, the system may activate the heating technology to maintain optimal hand temperature, while in warmer conditions, the cooling function may be employed to prevent overheating and discomfort.

The computer-based gaming system 209 may also be configured to alter 309 a running task and/or a program such as a game program. This feature ensures that the user's well-being is prioritized.

Additionally, the computer-based gaming system 209 may be designed to execute certain programs or tasks, such as game launchers or digitally downloaded games, only when it detects that the user's conditions are healthy. This may involve a preliminary health check before initiating a task and/or program.

The computer-based gaming system 209 may also be configured to achieve full functionality only after verifying that the user's 301 vital signs 303 fall within a healthy range. This configuration may encompass a health check mechanism that evaluates the user's 301 vital signs 303. Depending on the results, the computer-based gaming system 209 may restrict or limit access to certain functionalities of the computer-based gaming system 209 until the user's 301 health condition is deemed suitable for gaming.

The computer-based gaming system 209 may also include a feature capable of deactivating the vital sign detector's 207 influence on gameplay. This feature may be applicable in scenarios wherein gameplay mechanics are directly linked to monitoring a user's 301 vital signs 303. In situations where continued gameplay and/or use, is influenced by these vital signs 303, the system may decouple gameplay and/or functionalities of the computer-based gaming system 209 from the vital sign 303 inputs. This decoupling may result in an alteration 309 in the interaction between the computer-based gaming system 209 with the vital sign inputs, while monitoring of the vital signs 303 continues. Thus, despite the temporary suspension of the vital signs 303 data's direct impact on gameplay, the computer-based gaming system 209 may remain active in monitoring the users 301 vital signs 303.

The computer-based gaming system 209 may also include a feature to alter 309 the difficulty of a game. This alteration 309 may involve altering 309 various aspects of the game's challenge, such as enemy difficulty, puzzle complexity, or time constraints, depending on the specific game and situation. The computer-based gaming system 209 may implement this change to provide a more tailored gaming experience that may align with the user's 301 current health condition.

The computer-based gaming system 209 may also offer online functionalities wherein gameplay may be contingent upon the detection of healthy vital signs 303 from each participating user. 301 In such online gaming scenarios, the computer-based gaming system 209 may analyze the vital signs 303 of all users 301 involved, using this data to adapt the gameplay. The computer-based gaming system 209 may alter 309 the game's pace, difficulty, or other elements to ensure a health-conscious gaming environment for all users. 301

In addition to offering online play, the computer-based gaming system 209 may alter 309 user 301 interactions in online sessions. The computer-based gaming system 209 may modify a way in which a user 301 participates. This may involve altering 309 competitive elements, and/or offering collaborative gameplay and/or alternatives, and/or temporarily restricting interaction to manage the user's 301 health. The computer-based system 209 may also or instead actively monitor multiplayer interactions, providing support and/or intervention.

The computer-based gaming system 209 may also alter 309 multiplayer play. Alterations 309 may include modifying gameplay intensity, offering collaborative options, and/or limiting user interaction as appropriate.

The computer-based gaming system 209, may also alter 309 the users 301 interaction with the digital media by removing, and/or restricting, and/or prohibiting a user's participation in a multiplayer gaming session. In such instances, the computer-based gaming system 209 may substitute the user-controlled player with a computer-controlled player, known as a CPU. This substitution may ensure gameplay continuity while prioritizing the user's 301 health.

This computer-controlled player (CPU) may be configured to match the skill level of the user-controlled player it is replacing, and/or to align with the skill level of at least one other user-controlled player and/or computer-controlled player in the gaming session. Alternatively, the computer-controlled player may possess a skill rating that is below, equivalent, or above the overall skill level of the gaming lobby. Upon an improvement in the users 301 health status, the system may remove the computer-controlled player (CPU) and allow the user 301 to resume operations of their user-controlled player and/or position in the game.

The computer-based gaming system 209 may also communicate with the host system 201 to alter 309 a user's 301 online gaming capabilities. This alteration 309 may include modifying, limiting, or suspending the user's 301 participation in online gameplay. The host system 201 may implement these measures based on data from the computer-based gaming system 209, aligning the user's 301 participation with a health-conscious gaming environment.

Additionally, the computer-based gaming system 209 may restore the user's 301 online playing privileges upon detecting an improvement in their potentially unhealthy and/or unhealthy condition, 307 indicating a return to a healthier state.

The computer-based gaming system 209 may also alter 309 audio outputs. This alteration 309 may include altering 309 overall sound levels, changing music tracks, or delivering audio messages to the user. 301

Such alterations 309 in audio could include, but are not limited to, reducing the volume to minimize auditory strain, and/or playing calming music and/or providing verbal suggestions or guidance through the game's audio system. The computer-based gaming system 209 may alter 309 these audio elements based on real-time analysis of the user's health data.

In addition to individual audio alterations 309, the computer-based gaming system 209 may also convey messages to other players regarding a user's 301 condition. The computer-based gaming system 209 may generate audio messages informing other players in the gaming session. This may include notifications about the affected user's current state and/or suggestions for cooperative gameplay alterations 309 that may help accommodate the user's 301 health needs.

The computer-based gaming system 209 may also record data related to gameplay sessions that lead to and/or or leads to a potentially unhealthy and/or unhealthy conditions 307 in users. 301 The system may utilize this data to inform a user 301 recommendations in a digital store environment.

For example, say a user 301 exhibits an increased heart rate and/or stress while playing a horror game(s), the computer-based gaming system 209 may recommend against similar games in the digital store. This feature may help in guiding users 301 towards choices better aligned with their health profile. Furthermore, the computer-based gaming system 209 may also or instead provide a customized game browsing section, tailored to a user's 301 vital sign information.

The computer-based gaming system 209 may also collect and/or analyze gameplay data to determine correlations between specific games and the onset of unhealthy conditions in users. 301 This data may be displayed in a digital game store, providing insights into how certain games have affected the health of other players. This information may also be displayed when a user 301 connects to another user via share play and/or share screen technology.

For each game, the computer-based gaming system 209 may present statistics and/or findings showing the prevalence of various unhealthy conditions 307 experienced by users. 301 This data may be shown on the game's store page, giving potential buyers an overview of the game's health impact history.

The computer-based gaming system 209 may then compare these findings with the health profile of the individual user. 301 If a game is known to frequently cause potentially unhealthy and/or unhealthy conditions 307 that align with the user's 301 known health vulnerabilities, the computer-based gaming system 209 may advise against purchasing and/or playing the game. This recommendation process may use explicit warnings, suggestions for alternative, healthier gaming options, or even restrictions on purchasing games deemed particularly risky for the user's 301 health.

In cases where a user's 301 health profile suggests a high risk of experiencing specific unhealthy conditions, 307 the computer-based gaming system 209 may restrict the purchase and/or access to certain games. This preventive measure may be applied during browsing games in the digital store, viewing shared gameplay (like share play and/or share screen), watching videos of the game while using the computer-based gaming system 209 as the device to access the videos, and/or even when considering a game recommended by other users. 301

The computer-based gaming system 209 may incorporate ejection mechanisms that may work independently or in conjunction with locking mechanisms. Such ejection mechanisms may be designed to automatically eject physical game media, such as ROM (read only memory) cartridges, Game cartridges, compact discs, or other game storage formats, in response to detected unhealthy conditions. The system may also include a disc drive and/or cartridge reader slot equipped with a locking mechanism. This feature may prevent the insertion of physical game media to the extent necessary for the system to recognize and execute the game.

The computer-based gaming system 209 may be configured with software and/or firmware that selectively allows or prevents game execution based on the user's health status. This includes cases where a game, whether in physical media form such as ROM cartridges, and/or Game cartridge, and/or compact discs, and/or digital format stored on hard drives, solid-state drives, or external storage devices, is ready to be played. The system may perform a health check, following the process outlined in the flowchart of FIG. 1, before allowing the game to run. The execution of the game, regardless of its format, may only proceed if the health check confirms that the user's conditions are healthy.

The input peripherals 205 may be configured with hardware, software, and/or firmware to alter 309 functions such as button presses, joystick movements, or other interactive elements.

This may include a physical mechanism to block or lock input commands. For instance, a sliding cover or clamp might be employed, actuated by a solenoid to move into position, thereby preventing operation of the input controls.

Moreover, the locking mechanism may be remotely controlled via wireless communication technologies like Bluetooth, Wi-Fi, or radio frequency (RF), receiving signals from devices such as smartphones, computers, or gaming consoles to activate and/or deactivate the lock.

The actuator may be an integrated wireless device, housing both the mechanical locking components and the communication module, and capable of executing lock/unlock commands received from the gaming system.

Additionally, the motion of the input peripheral 205, such as a computer mouse and/or motion-sensing device, and/or controller, may be altered 309 as well.

The input peripheral, 205 whether integrated with and/or separate from the computer-based gaming system, may be configured to include locking mechanisms. These mechanisms may be designed to prevent and/or restrict the physical depression of buttons on a range of devices including but not limited to game controllers, computer mice, or keyboards. It may also restrict the movement of an analog stick, and/or joystick and/or lever. Furthermore, the software and/or firmware of the input peripheral may be adapted so that, even if a button is physically pressed, the input may not necessarily be registered by the system. This alteration 309 may serve as a potential intervention to pause gameplay, which may prompt the user to address their health condition before continuing. Such features may ensure the safety and well-being of the user under various conditions. This mechanism may be implemented to physically block and/or lock the buttons and/or lever and/or joystick of an input peripheral 205 This may be a sliding cover, a clamp, or any other structure that may be moved into place to prevent the button from being pressed. A solenoid may serve as the actuator for this task. Upon activation, the solenoid may move the locking mechanism into place, and upon deactivation, it retracts the mechanism, allowing free use of the buttons.

The input peripheral, 205 may also have a feature wherein, if a user successfully presses a button and/or or engages with a lever and/or analog stick that may be equipped with the input peripheral 205, the inputs may not be registered by the system in response to an unhealthy condition detected in the user.

In addition to manual operation, this locking mechanism may be controlled remotely. The input peripheral 205 may be equipped with a wireless communication module, such as Bluetooth, Wi-Fi, or RF, enabling it to receive signals from an external device, which could be a smartphone, computer, or gaming console. When this module receives a specific command, it may trigger the solenoid to activate or deactivate the locking mechanism.

Furthermore, the actuator itself may be designed as a self-contained wireless device that directly communicates with the game controller. This integrated actuator may house both the mechanical components needed for the locking action and a built-in wireless module. When it receives a signal from an external device, the actuator may execute the command to lock and/or unlock the buttons.

The input peripheral 205 may also be altered 309 in a way wherein the movement of an input peripheral 205.

The computer-based gaming system 209 may also alter 309 the video games virtual environment. For example, in a scenario where a player is repeatedly failing to complete a challenging jump onto a hill, and/or led, the computer-based gaming system 209 may alter the height of the hill and/or ledge within the virtual environment, making the task more achievable.

It's imperative to recognize that the scenarios outlined are illustrative and by no means comprehensive. The realm of digital interaction is vast, and the consequences of changes within this sphere can vary widely based on the specific context and user needs.

Components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

Except as otherwise stated immediately above, nothing that has been stated or illustrated is intended or should be interpreted to cause a dedication of any component, step, feature, object, benefit, advantage, or equivalent to the public, regardless of whether it is recited in the claims.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The invention claimed is:

1. Non-transitory computer-readable storage media containing a program of instructions that, when run in conjunction with a computer-based gaming system that generates digital media that a user of the gaming system can interact with in one or more ways:
    receives information indicative of at least one vital sign of the user;
    determines whether the received information is indicative of an unhealthy condition in the user that may be caused by one or more of the ways in which the user interacts with the digital media; and
    in response to a determination that the received information is indicative of such an unhealthy condition in the user:
        alters one or more but not all of the ways in which the user may interact with the digital media that is or are contributing to the unhealthy condition in the user in a manner that improves the unhealthy condition while the user continues to interact with the digital media; and after making such alterations in response to the determination of the unhealthy condition, does not make any further alterations to the one or more ways in which the user may interact with the digital media in response to an unhealthy condition while the user continues to interact with the digital media until after a set cooldown period.

2. The non-transitory computer-readable storage media of claim 1 wherein:
    the digital media includes a virtual character at least one of whose actions may be controlled by the user; and
    the response to a determination that the received information is indicative of such an unhealthy condition includes altering one or more but not all of the ways in which the user may control the virtual character in a manner that improves the unhealthy condition while the user continues to interact with the digital media.

3. The non-transitory computer-readable storage media of claim 1 wherein:
    the digital media includes a virtual vehicle at least one of the actions of which may be controlled by the user; and
    the response to a determination that the received information is indicative of such an unhealthy condition includes altering one or more but all of the ways in which the user may control the virtual vehicle in a manner that improves the unhealthy condition while the user continues to interact with the digital media.

4. The non-transitory computer-readable storage media of claim 1 wherein:
    the received information indicative of at least one vital sign of the user includes information indicative of the user's respiratory rate; and
    the unhealthy condition that the system determines the received information is indicative of includes an unhealthy respiratory rate.

5. The non-transitory computer-readable storage media of claim 1 wherein:
    the received information indicative of at least one vital sign of the user includes information indicative of the user's blood pressure; and
    the unhealthy condition that the system determines the received information is indicative of includes an unhealthy blood pressure.

6. The non-transitory computer-readable storage media of claim 1 wherein:
    the received information indicative of at least one vital sign of the user includes information indicative of the user's temperature; and
    the unhealthy that the system determines the received information is indicative of includes an unhealthy temperature.

7. The non-transitory computer-readable storage media of claim 1 wherein
    the received information indicative of at least one vital sign of the user includes information indicative of the user's EEG readings; and
    the unhealthy condition that the system determines the received information is indicative of includes an unhealthy EEG reading.

8. The non-transitory computer-readable storage media of claim 1 wherein the alteration to the way in which the user may interact with the digital media includes reducing the amount of effort that a user must make to achieve the same level of success in the game.

9. The non-transitory computer-readable storage media of claim 8 wherein the reducing the amount of effort includes reducing the amount of intellectual effort that user must make to achieve the same level of success.

10. The non-transitory computer-readable storage media of claim 8 wherein the reducing the amount of effort includes reducing the amount of physical effort that user must make to achieve the same level of success.

11. The non-transitory computer-readable storage media of claim 1 wherein:
the at least one vital sign of the user includes the rate of the user's heartbeat; and
the determination of whether the received information is indicative of an unhealthy condition in the user is based on the rate of the user's heartbeat.

12. The non-transitory computer-readable storage media of claim 1 wherein the program of instructions utilizes artificial intelligence to help determine which of the one or more ways in which the user may interact with the digital media should be altered to help improve the unhealthy condition.

13. The non-transitory computer-readable storage media of claim 12 wherein the artificial intelligence analyzes a history of the user's vital sign and the way in which the user was interacting with the digital media at each point in this history to help determine which of the one or more ways in which the user may interact with the digital media should be altered to improve the unhealthy condition.

14. The non-transitory computer-readable storage media of claim 1 wherein:
the digital media includes a virtual environment; and
the response to a determination that the received information is indicative of such an unhealthy condition includes altering the virtual environment in a manner that improves the unhealthy condition.

15. Non-transitory computer-readable storage media containing a program of instructions that, when run in conjunction with a computer-based gaming system that generates digital media that a user of the gaming system can interact with in one or more ways:
receives information indicative of at least one vital sign of the user;
determines whether the received information is indicative of an unhealthy condition in the user that may be caused by one or more of the ways in which the user interacts with the digital media; and
in response to a determination that the received information is indicative of such an unhealthy condition in the user:
alters one or more but not all of the ways in which the user may interact with the digital media that is or are contributing to the unhealthy condition in the user in a manner that improves the unhealthy condition while the user continues to interact with the digital media and
limits the number of times the digital media interaction is altered for the user in response to an unhealthy condition caused by one or more ways in which the user interacts with the digital media to a predetermined maximum number of alterations.

\* \* \* \* \*